(12) United States Patent
Anand et al.

(10) Patent No.: US 11,831,460 B2
(45) Date of Patent: Nov. 28, 2023

(54) METHOD AND WEARABLE DEVICE FOR ENHANCING QUALITY OF EXPERIENCE INDEX FOR USER IN IOT NETWORK

(71) Applicant: Samsung Electronics Co., Ltd., Suwon-si (KR)

(72) Inventors: Satyajit Anand, Bangalore (IN); Mayank Singh, Bangalore (IN); Ajit S Bopardikar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/889,669

(22) Filed: Aug. 17, 2022

(65) Prior Publication Data

US 2023/0056983 A1    Feb. 23, 2023

Related U.S. Application Data

(63) Continuation of application No. PCT/KR2022/010543, filed on Jul. 19, 2022.

(30) Foreign Application Priority Data

Aug. 5, 2021   (IN) .............................. 202141035421

(51) Int. Cl.
*H04L 65/80*    (2022.01)
*H04L 12/28*    (2006.01)
(Continued)

(52) U.S. Cl.
CPC .......... *H04L 12/2803* (2013.01); *H04L 65/80* (2013.01); *H04L 67/125* (2013.01); *H04W 24/02* (2013.01)

(58) Field of Classification Search
CPC ... H04L 12/2803; H04L 65/80; H04L 67/125; H04L 65/1046; H04L 67/12; H04W 24/02
See application file for complete search history.

(56) References Cited

U.S. PATENT DOCUMENTS 8,405,859 B2 * 3/2013 Torii ..................... G06F 3/1204
                                                     358/1.15
10,013,977 B2   7/2018 Fu
(Continued)

FOREIGN PATENT DOCUMENTS

CN        104062912 A     9/2014
CN        108418861 A     8/2018
(Continued)

OTHER PUBLICATIONS

International Search Report dated Oct. 19, 2022, issued in an International Application No. PCT/KR2022/010543.

*Primary Examiner* — Oanh Duong
(74) *Attorney, Agent, or Firm* — Jefferson IP Law, LLP

(57) ABSTRACT

A method for enhancing a Quality of Experience (QoE) index, by a wearable device, for a user in an Internet of things (IoT) network comprising a plurality of IoT devices is provided. The method includes monitoring the QoE index of the user in the IoT network, detecting a drop in the QoE index of the user, determining whether the dropped QoE index is less than a QoE threshold, in response to determining that the dropped QoE index is less than the QoE threshold, determining at least one IoT device from the plurality of IoT devices that is responsible for the drop in the QoE index of the user using an Artificial intelligence (AI) model, and controlling the IoT device(s) to raise the QoE index of the user above the QoE threshold.

20 Claims, 9 Drawing Sheets

(51) Int. Cl.
*H04L 67/125* (2022.01)
*H04W 24/02* (2009.01)

(56) References Cited

U.S. PATENT DOCUMENTS

| | | | |
|---|---|---|---|
| 10,359,807 | B2 | 7/2019 | Cronin et al. |
| 10,387,240 | B2* | 8/2019 | Shinde ................ G06F 11/0709 |
| 10,528,121 | B2 | 1/2020 | Tanaka et al. |
| 2015/0057808 | A1 | 2/2015 | Cook et al. |
| 2015/0145653 | A1 | 5/2015 | Katingari et al. |
| 2016/0223218 | A1* | 8/2016 | Barrett ..................... F24F 11/52 |
| 2017/0046243 | A1 | 2/2017 | Shinde et al. |
| 2018/0041788 | A1* | 2/2018 | Wang ............... H04N 21/23805 |
| 2018/0168464 | A1 | 6/2018 | Barrett, Jr. et al. |
| 2019/0098067 | A1* | 3/2019 | Sandoval .......... H02J 13/00024 |
| 2020/0053312 | A1 | 2/2020 | Mukherjee et al. |
| 2020/0110890 | A1* | 4/2020 | Woo ....................... H04L 67/535 |
| 2020/0244765 | A1 | 7/2020 | Uppili |
| 2020/0334730 | A1 | 10/2020 | Westlake et al. |
| 2021/0152640 | A1* | 5/2021 | Silverstein .............. G06F 3/167 |
| 2021/0350917 | A1* | 11/2021 | Curtis ....................... G06N 3/08 |
| 2022/0045959 | A1* | 2/2022 | Chauhan ............. H04L 43/0894 |
| 2022/0271999 | A1* | 8/2022 | Jeong ..................... H04L 41/16 |

FOREIGN PATENT DOCUMENTS

| | | |
|---|---|---|
| CN | 109613902 A | 4/2019 |
| JP | 2018018217 A | 2/2018 |

\* cited by examiner

METHOD AND WEARABLE DEVICE FOR ENHANCING QUALITY OF EXPERIENCE INDEX FOR USER IN IOT NETWORK

CROSS-REFERENCE TO RELATED APPLICATION(S)

This application is a continuation application, claiming priority under § 365(c), of an International application No. PCT/KR2022/010543, filed on Jul. 19, 2022, which is based on and claims the benefit of an Indian patent application number 202141035421, filed on Aug. 5, 2021, in the Indian Intellectual Property Office, the disclosure of which is incorporated by reference herein in its entirety.

DESCRIPTION

Technical Field

The disclosure relates to a wearable device. More particularly, the disclosure relates to a method and the wearable device for enhancing a Quality of Experience (QoE) index for a user in an Internet of things (IoT) network.

BACKGROUND ART

FIG. 1 illustrates an example scenario in which a user manually controls numerous IoT devices in an IoT network, according to the related art.

In general, a smart home is a convenient home setup in which home appliances/electronic devices/IoT devices may be automatically operated remotely using a mobile or other networked device located anywhere in world. The home appliances/electronic devices/IoT devices are connected to internet and control tasks such as home security, heating, lighting, and home theater. Furthermore, the smart home consists of multiple smart applications. The home appliances/electronic devices/IoT devices (e.g. robot vacuums cleaner (4), fan (5), smart air conditioner (6), router (7), smart refrigerator (8), coffee machine (9), oven (10), smart washing machine (11), and smart dishwasher (12)) are, in most cases, connected with each other and/or can be accessed through a central point (2-3). The central point (2-3) is manually controlled by a user (1), as illustrated in FIG. 1. Examples of central points are laptops, tablets, smartphones, or other smart devices. The smart applications can be used to execute various tasks in a user's home. For instance, the smart applications can control temperature of the user's home, switch appliances on or off, control lighting, or program other smart devices such as a smart Barbecue (BBQ) grill.

In some of the existing methods/electronic devices, the user (1) must manually control the home appliances/electronic devices/IoT devices by generating voice/text messages/manually perform some action on the central point (2-3) every time. The user (1) must build up routines to activate the home appliances/electronic devices/IoT devices based on a certain phrase, at a specific time of day, or on specific days. These routines might involve turning the IoT devices on and off or getting news briefs or weather related information, etc. For example, the phrase "Jarvis, good morning" triggers the user's (1) morning ritual. That command turns on lights, provides the weather related information, goes through the news brief and starts the coffee machine (9). Furthermore, the user (1) must memorize specific phrases/commands to control the home appliances/electronic devices/IoT devices, which is a little difficult for non-technical users because the specific phrases/commands were a little unnatural talking to the home appliances/electronic devices/IoT devices. With time and experience, may become easier.

Consider an example scenario in which the user enters a kitchen and begins sweating after a few minutes, indicating a reduction/drop in a QoE index (i.e. user comfort level). So, in order to increase the QoE index, in some of the existing methods, the user must manually pick an IoT device to increase the QoE index. However, sometimes the user does not know an instantaneous solution to overcome the QoE index drops and hence may not be able to determine which of the IoT devices can best help quickly. For example, the user must manually select whether to start the fan, air conditioner or lower the light. There are several options available, but all of the options need to be manual operated, which may be time-consuming and inconvenient for the user. Thus, it is desired to provide a useful alternative for enhancing the QoE index for the user in an IoT network.

The above information is presented as background information only to assist with an understanding of the disclosure. No determination has been made, and no assertion is made, as to whether any of the above might be applicable as prior art with regard to the disclosure.

DISCLOSURE

Technical Solution

In accordance with an aspect of the disclosure, a method for enhancing a QoE index for a user in an IoT network comprising a plurality of IoT devices is provided. The method includes monitoring, by a wearable device, the QoE index of the user in the IoT network, detecting, by the wearable device of the user, a drop in the QoE index of the user, determining, by the wearable device, whether the dropped QoE index of the user is lower than a QoE threshold, in response to determining that the dropped QoE index of the user is lower than the QoE threshold, determining, by the wearable device, at least on IoT device from the plurality of IoT devices that is responsible for the drop in the QoE index of the user using an AI model, and controlling, by the wearable device, the at least one IoT device to raise the QoE index of the user above the QoE threshold.

In accordance with an embodiment of the disclosure, a wearable device for enhancing the QoE index for the user in the IoT network is provided. The wearable device includes a QoE controller coupled with a processor and a memory. The QoE controller is configured to monitor the QoE index of the user in the IoT network, detect the drop in the QoE index of the user, determine whether the dropped QoE index of the user is lower than the QoE threshold, in response to the determination that the dropped QoE index of the user is lower than the QoE threshold, determine at least one IoT device from the plurality of IoT devices that is responsible for the drop in the QoE index of the user using the AI model, and control the IoT device(s) to raise the QoE index of the user above the QoE threshold.

In accordance with an embodiment of the disclosure, a computer-readable recording medium is provided. The computer-readable recording medium has recorded thereon a program for executing, the method for enhancing a QoE index for a user in an IoT network comprising a plurality of IoT devices. Other aspects, advantages, and salient features of the disclosure will become apparent to those skilled in the art from the following detailed description, which, taken in conjunction with the annexed drawings discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
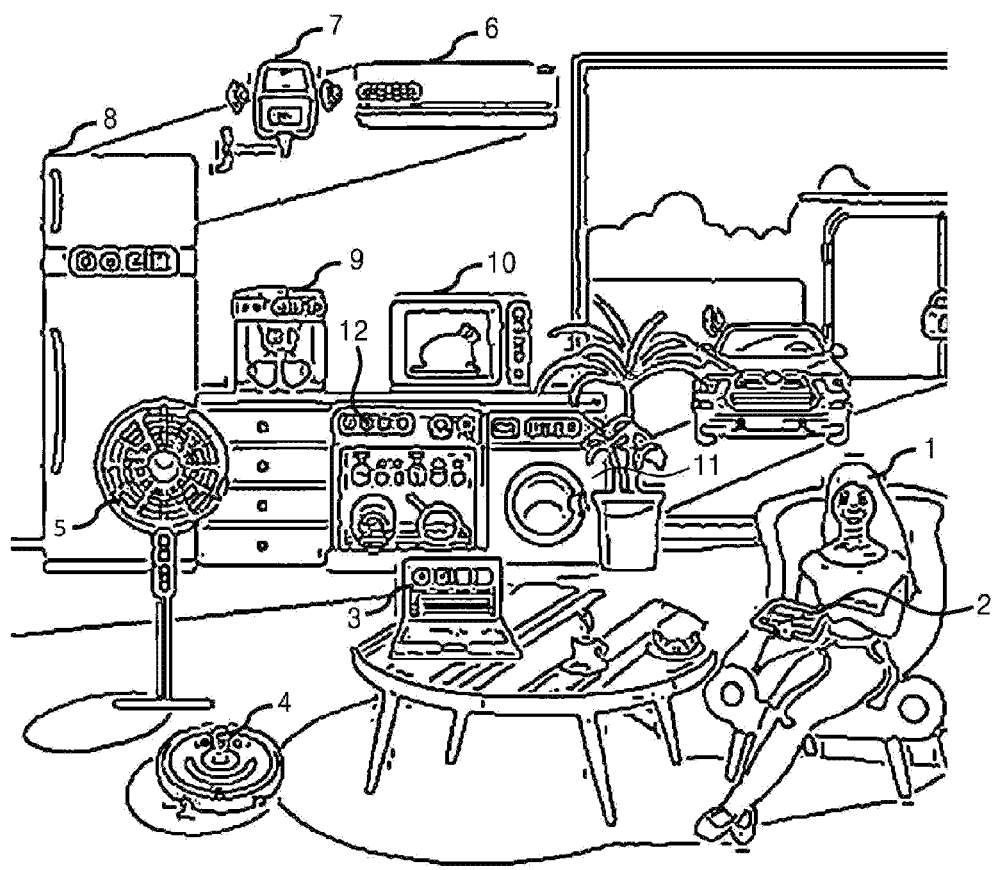
FIG. 1 illustrates an example scenario in which a user manually controls numerous IoT devices in an IoT network, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for enhancing a QoE index for a user in an IoT network comprising a plurality of IoT devices. The method includes monitoring, by a wearable device of the user, the QoE index of the user in the IoT network. Further, the method includes detecting, by the wearable device of the user, a drop in the QoE index of the user. Further, the method includes determining, by the wearable device of the user, whether the dropped QoE index of the user is lower than a QoE threshold. Further, the method includes determining, by the wearable device of the user, IoT device(s) from the plurality of IoT devices that is responsible for the drop in the QoE index of the user using an AI model in response to determining that the dropped QoE index of the user is lower than the QoE threshold. Further, the method includes automatically controlling, by the wearable device of the user, the IoT device(s) to raise the QoE index of the user above the QoE threshold. For example, the QoE threshold means a pre-defined value and may be a reference value for determining whether the QoE index rises or drops.

Accordingly, embodiments herein disclose the wearable device for enhancing the QoE index for the user in the IoT network. The wearable device includes a QoE controller coupled with a processor and a memory. The QoE controller is configured to monitor the QoE index of the user in the IoT network. Further, the QoE controller is configured to detect the drop in the QoE index of the user. Further, the QoE controller is configured to determine whether the dropped QoE index of the user is lower than the QoE threshold. Further, the QoE controller is configured to determine IoT device(s) from the plurality of IoT devices that is responsible for the drop in the QoE index of the user using the AI model in response to determining that the dropped QoE index of the user is lower than the QoE threshold. Further, the QoE controller is configured to automatically control the IoT device(s) to raise the QoE index of the user above the QoE threshold.

Unlike existing methods and systems, the proposed method allows the wearable device to detect a change/drop in the QoE index of the user. The QoE index of the user is automatically detected based on a change in emotional state (e.g. a calm state to an agitated state, a sudden irritation state) of the user and change in body comfort parameter (e.g. sweating, breath shortness, etc.) of the user using the wearable device and automatically control IoT device(s) to raise the QoE index of the user above the QoE threshold. The IoT device(s) are automatically controlled to raise the user's QoE index without manual intervention, resulting in convenient, continuous, and accurate monitoring of the QoE index discreetly at backend.

Unlike existing methods and systems, the proposed method allows the wearable device to determine a current context of each IoT device of the plurality of IoT devices, and current operational data of each IoT device of the plurality of IoT devices. Furthermore, the wearable device correlates the IoT device with each other by applying the AI model on the detected drop in the QoE index of the user, the current context of each of the IoT device, and the current operation data of each of the IoT device. Furthermore, the wearable device determines the IoT device(s) from the plurality of IoT devices that is responsible for the drop in the QoE index based on the correlation.

Unlike existing methods and systems, the proposed method allows the wearable device to retrieve new operational data for the IoT device(s) to raise the QoE index of the user above the QoE threshold by applying the AI model on the detected drop in the QoE index of the user, the current context of each of the IoT device and the IoT device(s) from the plurality of IoT devices that is responsible for the drop in the QoE index based on the correlation. Furthermore, the wearable device modifies the current operational data of the IoT device(s) using the retrieved new operational data to raise the QoE index of the user above the QoE threshold.

Referring now to the drawings, and more particularly to FIGS. 2 through 6, where similar reference characters denote corresponding features consistently throughout the figures, there are shown preferred embodiments.

Figure 2:
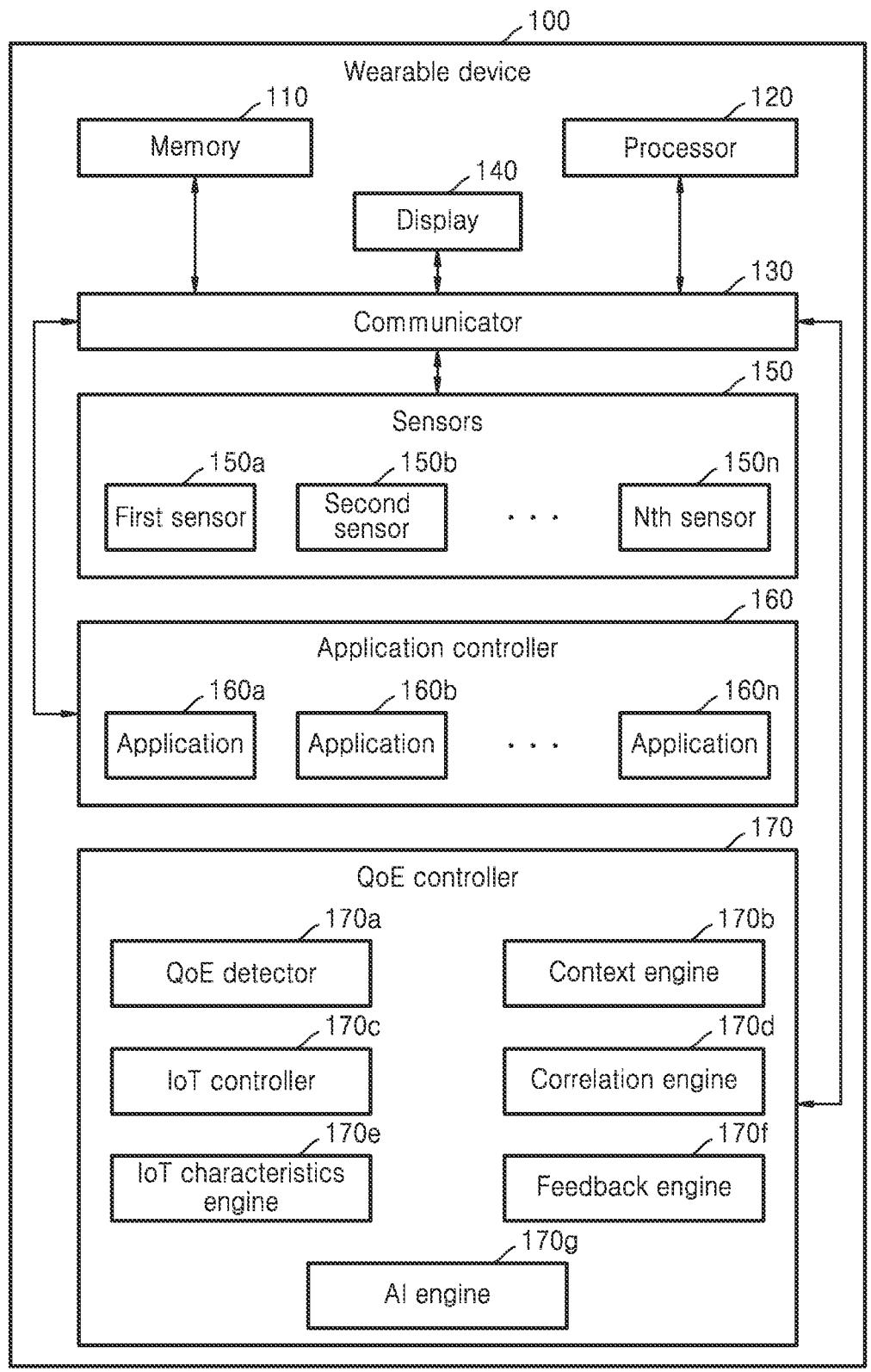
FIG. 2 illustrates a block diagram of a wearable device for enhancing a QoE index for a user in the IoT network, according to an embodiment of the disclosure.

FIG. 2 illustrates a block diagram of a wearable device (100) for enhancing a QoE index for a user in the IoT network, according to an embodiment of the disclosure. The wearable device (100) can be, for example, but not limited to a smartphone, a tablet, a laptop, an internet of things (IoT) device, a User Equipment (UE), a smart glass, a smartwatch, or alike.

In an embodiment, the wearable device (100) includes a memory (110), a processor (120), a communicator (130), a display (140), a sensor(s) (150), an application controller (160) and a QoE controller (170).

The memory (110) stores the QoE index, a QoE threshold, an emotional state of the user, a body-comfort parameter of the user, a current context of each IoT device of a plurality of IoT devices, current operational data of each IoT device of the plurality of IoT devices, correlation data, retrieve new operational data, and user's manually invoked action.

Further, the memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information. In certain examples, a non-transitory storage medium may store data that can, over time, change (e.g., in Random Access Memory (RAM) or cache). The memory (110) can be an internal storage unit or it can be an external storage unit of the wearable device (100), a cloud storage, or any other type of external storage.

The processor (120) communicates with the memory (110), the communicator (130), the display (140), the sensor(s) (150), the application controller (160), and the QoE controller (170). The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an AI dedicated processor such as a neural processing unit (NPU).

The communicator (130) includes an electronic circuit specific to a standard that enables wired or wireless communication. The communicator (130) is configured for communicating internally between internal hardware components and with external devices via one or more networks. The sensor(s) (150 or 150a, 150b, . . . 150n) can be, for example, but not limited to an ambient light sensor, 3-axis accelerometer, an altimeter, an optical heart rate sensor, an oxygen saturation (SpO2) monitor, a bioimpedance sensor, a proximity sensor, a compass, an Electrocardiogram (ECG) sensor, a Global Positioning System (GPS), a gyroscope, a gesture sensor, an Ultraviolet (UV) sensor, a magnetometer, an electrodermal activity sensor, a skin temperature sensor, etc.

The application controller (160) is configured to control a plurality of applications (160a, 160b, . . . 160n) of the wearable device (100). Examples for the application are, but not limited to a media application, a web application, a video player application, a camera application, a business application, an education application, a lifestyle application, an entertainment application, a utility application, a travel application, etc.

In an embodiment, the QoE controller (170) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

In an embodiment, the QoE controller (170) is configured to monitor the QoE index of the user in the IoT network. Further, the QoE controller (170) is configured to detect a drop in the QoE index of the user. Further, the QoE controller (170) is configured to determine whether the dropped QoE index of the user is lower than the QoE threshold. Further, the QoE controller (170) is configured to determine the IoT device(s) of the plurality of IoT devices that is responsible for the drop in the QoE index of the user using an AI model (i.e. AI engine) in response to determining that the dropped QoE index of the user is lower than the QoE threshold. Further, the QoE controller (170) is configured to automatically control the IoT device(s) to raise the QoE index of the user above the QoE threshold. For example, the QoE threshold means a pre-defined value and may be a reference value for determining whether the QoE index rises or drops.

Further, the QoE controller (170) is configured to determine the QoE index of the user based on a calculation of the changes in the emotional state of the user and changes in the body-comfort parameter of the user. The emotional state of the user includes a calm state to an agitate state and a sudden irritation state, and where the body-comfort parameter of the user includes sweating, breath shortness. Further, the QoE controller (170) is configured to store the QoE index of the user in database (i.e. the memory (110)).

Further, the QoE controller (170) is configured to determine the current context of each IoT device of the plurality of IoT devices and the current operational data of each IoT device of the plurality of IoT devices. Further, the QoE controller (170) is configured to correlate the IoT device with each other by applying the AI model on the detected drop in the QoE index of the user, the current context of each of the IoT devices, and the current operation data of each of the IoT device. Further, the QoE controller (170) is configured to determine the IoT device(s) from the plurality of IoT devices that is responsible for the drop in the QoE index based on the correlation.

Further, the QoE controller (170) is configured to determine an activity of the user, environmental context associated with the user, current status of the IoT device(s) of the plurality of IoT devices, and recent changes in the current status of the IoT device(s) of the plurality of IoT devices.

Further, the QoE controller (170) is configured to retrieve the new operational data for the IoT device(s) to raise the QoE index of the user above the QoE threshold by applying the AI model on the detected drop in the QoE index of the user, the current context of each of the IoT device and the IoT device(s) of the plurality of IoT devices that is responsible for the drop in the QoE index based on the correlation. Further, the QoE controller (170) is configured to modify the current operational data of the IoT device(s) using the retrieved new operational data to raise the QoE index of the user above the QoE threshold.

Further, the QoE controller (170) is configured to detect a raise in the QoE index of the user in the IoT network by modifying the current operational data of the IoT device(s) using the retrieved new operational data. Further, the QoE controller (170) is configured to compare the modified current operational data of the IoT device(s) with the current operational data to derive arbitration data. Further, the QoE controller (170) is configured to store the derived arbitration data in the AI model for future prediction to raise the QoE index of the user above the QoE threshold.

In an embodiment, the QoE controller (170) includes a QoE detector (170*a*), a context engine (170*b*), an IoT controller (170*c*), a correlation engine (170*d*), an IoT characteristic engine (170*e*), a feedback engine (170*f*) and an AI engine (170*g*).

In an embodiment, the QoE detector (170*a*) determines the QoE index of the user based on the calculation of changes in the emotional state (e.g. irritation, angry, pleased, etc.) of the user, changes in body-comfort level (e.g. sweating, breath shortness, etc.) of the user by using the sensors (150) (physiological state such as heart rate, SpO2, blood pressure, etc.), and context information from the context engine (170*b*). The body-comfort parameter (BCP) is calculated based on the emotional state, the body-comfort level, and the context information from the context engine (170*b*), the BCP $\in$ [0, 100], where "0" is the lowest value and "100" is the highest value of the BCP.

In an embodiment, the context engine (170*b*) determines the activity of the user (e.g. cooking, walking, workout, driving, reading, etc.) and the environmental context (current context) associated with the user. Table-1 illustrates an example of the environmental context.

TABLE 1

| Environmental context | Information |
|---|---|
| Time | Hours (0~24), Day (sun~sat), Climate (Rainy, . . .), etc. |
| Location | Home → kitchen, bedroom, dining room, office, car, etc. |
| Ambient | Noise level (dB), Brightness (illumination), etc. |

In an embodiment, the IoT controller (170*c*) determines the current status of the IoT device of the plurality of IoT devices and the recent changes in the current status of the IoT device(s) from the plurality of IoT devices. Table-2 illustrates an example of the current status of the IoT device.

TABLE 2

| List of IoT devices in the IoT network | Current status of IoT device |
|---|---|
| Fan | Medium speed [since last 10 min] |
| Micro Wave | Off [since last 2 hours] |
| Induction | On [since last 10 min] |
| Chimney | On [running at top speed] |
| Bulb | Off |
| Smartwatch | Sweating detected |
| Humidity sensor | Moderate level |
| Temperature | Moderate [30 degree Celsius] |
| Dehumidifier | Low speed [since last 30 min] |

In an embodiment, the correlation engine (170*d*) correlates the IoT device with each other by applying the AI model on the detected drop in the QoE index of the user, the current context of each of the IoT devices, and the current operation data of each of the IoT device.

For example, consider a scenario in which the user in a kitchen, the QoE detector (170*a*) determine the QoE index of the user based on the calculation of changes in the emotional state (e.g. irritation) of the user, changes in the body-comfort level (e.g. sweating/humidity) of the user by using the sensors (150). Furthermore, the context engine (170*b*) determines that the activity of the user is cooking, the environmental contexts are location (i.e. kitchen) and ambient (i.e. silent). Furthermore, the IoT controller (170*c*)

determines the current status of the IoT device of the plurality of IoT devices in the kitchen and the recent changes in the current status of the IoT device(s) from the plurality of IoT devices in the kitchen. Then, the correlation engine (170*d*) correlates the IoT device with each other by applying the AI model on the detected drop in the QoE index of the user, the current context of each of the IoT devices in the kitchen, and the current operation data of each of the IoT device at the kitchen and determine that which IoT device at the kitchen can affect humidity and temperature. In other words, the correlation engine (170*d*) uses the correlation to determine which IoT device(s) in the kitchen are responsible for the reduction in the QoE index.

Furthermore, the correlation engine (170*d*) compares previous operational data or current operational data and new operational data values of the IoT device(s) and previous/current/new contexts of each IoT device of the plurality of IoT devices. Furthermore, the correlation engine (170*d*) identifies the difference in the status of the IoT device(s) (these cause user's new QoE after-action invocation). It validates the IoT characteristics engine (170*e*). When the IoT characteristics engine (170*e*) predicted wrong or none value using the AI engine (170*g*), the IoT characteristics engine (170*e*) updates the correct value to the AI engine (170*g*).

For example, consider a scenario in which the AI engine (170*g*) predicted "Fan" as the IoT device to raise the QoE index of the user above the QoE threshold. However, the user turn-on an air conditioner manually to raise the QoE index of the user above the QoE threshold. As a result, the correlation engine (170*d*)/the IoT characteristics engine (170*e*) predicted the wrong IoT device as "Fan "and updates the correct value to the AI engine (170*g*).

In an embodiment, the IoT characteristic engine (170*e*) retrieves the new operational data (i.e. IoT device characteristics value) for the IoT device(s) to raise the QoE index of the user above the QoE threshold by applying the AI model (i.e. the AI engine (170*g*)) on the detected drop in the QoE index of the user, the current context of each of the IoT device and the IoT device(s) from the plurality of IoT devices that is responsible for the drop in the QoE index based on the correlation. The IoT controller (170*c*) then modifies the current operational data of the IoT device(s) using the retrieved new operational data to raise the QoE index of the user above the QoE threshold. In other words, the IoT controller (170*c*) can first take a user's consent through the wearable device (100) before invoking action or using the retrieved new operational data.

In an embodiment, the AI engine (170*g*) includes a reinforcement learning model and a reinforcement learning policy. The reinforcement learning model stores state-value pair dataset. Where the state is a permutation of the QoE index, correlated values of contexts & IoT device status and the value is IoT device characteristics for each permutation of states. Table-3 illustrates an example of the state-value pair dataset.

TABLE 3

| State | Value |
| --- | --- |
| [QoE= {"changed values"}, Context= {"Kitchen", "Silent"}, IoT status= {"smart watch=sweating", "humidity sensor=high", "dehumidifier=off", "temperature sensor =30", "chimney=off" ...} ] | [dehumidifier="high", chimney="medium"] |

The reinforcement learning policy acts as the policy of the learning model (i.e. the AI engine (170*g*)). The reinforcement learning policy receives a new value (arbitrated value of IoT device characteristic) corresponding to a state, from the feedback engine (170*f*). The new arbitrated value acts as the value of the rewards for the IoT characteristic engine (170*e*). The reinforcement learning policy updates the reinforcement learning model based on the value of the rewards.

For example, if the arbitrated value for a particular state is the same as existing in the AI engine (170*g*), then it's a positive reward (the AI engine (170*g*) has good prediction and no update needed). However, if the arbitrated value for a particular state is different as existing in the AI engine (170*g*), then it's a negative reward (model has the wrong prediction and the AI engine (170*g*) is updated based on the arbitrated value).

Furthermore, the reinforcement learning model holds different models for each unique user. For example, suppose the IoT network comprises several users wearing the wearable device (100) (for example, wearable device (100A) for the father, wearable device (100B) for the mother, and wearable device (100C) for the son in a family) The reinforcement learning method generates three learning models, and each user is identifiable via a user account or a well-known approach such as User identification.

Furthermore, the previously trained learning model from a user can be utilized on-device for individual IoT devices or in another IoT network. As a result, the learning model does not need to be trained again. The user may save the model to a cloud or locally and then port/re-use it later on-device to particular devices or at various IoT networks (through backup and restore).

At least one of the plurality of modules/components, as mentioned above, maybe implemented through the AI engine (170*g*). A function associated with the AI engine (170*g*) may be performed through memory (110) and the processor (120). One or a plurality of processors controls the processing of the input data in accordance with a predefined operating rule or the AI engine (170*g*) stored in the non-volatile memory and the volatile memory. The predefined operating rule or artificial intelligence model is provided through training or learning.

Here, being provided through learning means that, by applying a learning process to a plurality of learning data, a predefined operating rule or the AI engine (170*g*) of the desired characteristic is made. The learning may be performed in the wearable device (100) itself in which AI according to an embodiment is performed, and/or maybe implemented through a separate server/system.

The AI engine (170*g*) may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

Figure 5:
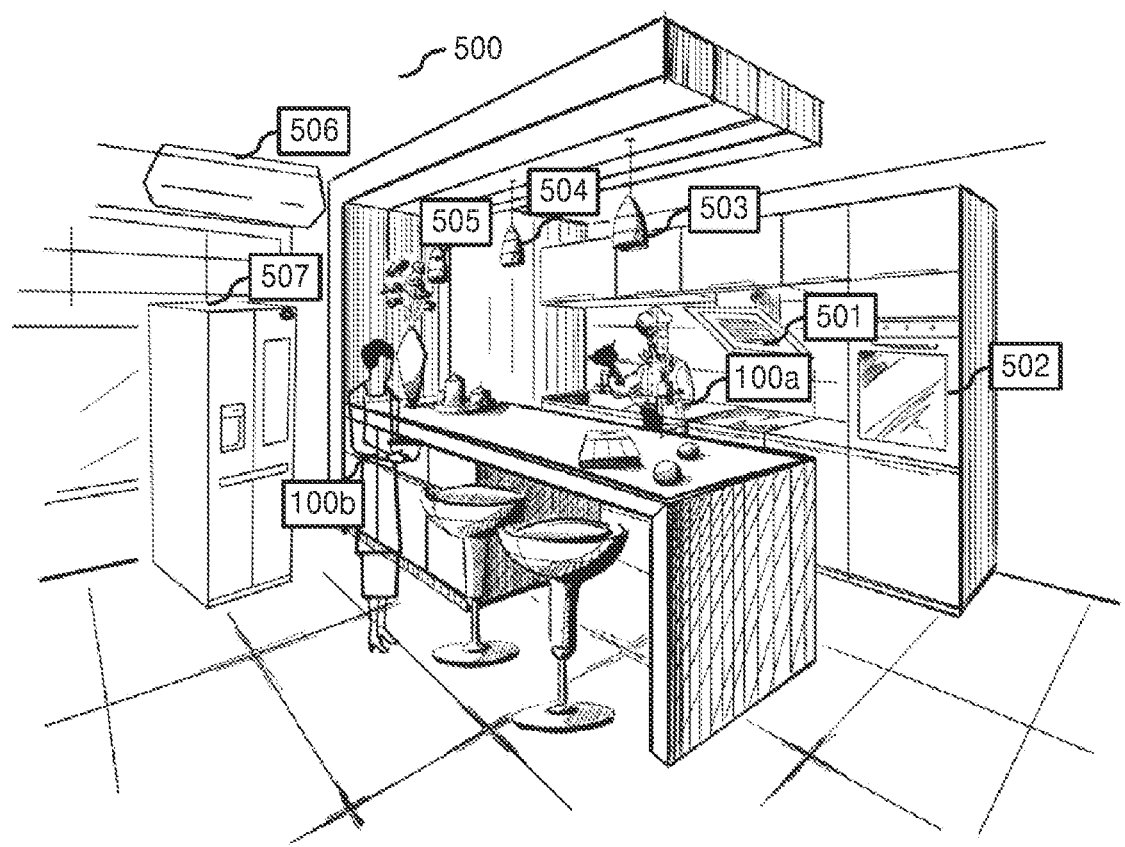
FIG. 5 is an example illustration in which the wearable device detecting the drop in the QoE index of the user while the user is working in a kitchen and automatically controlling the IoT device(s) to raise the QoE index of the user over the QoE threshold according to an embodiment of the disclosure.

The learning process is a method for training a predetermined target device (for example, a robot, IoT device(s), one of example scenario is given in FIG. 5) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 2 shows various hardware components of the wearable device (100) but it is to be understood that other embodiments are not limited thereon. In other embodiments, the wearable device (100) may include a lessor or greater number of components. Further, the labels or names of the components are used only for illustrative purpose and does not limit the scope of the disclosure. One or more components can be combined together to perform the same or substantially similar function to enhance the QoE index for the user in the IoT network.

Figure 3A:
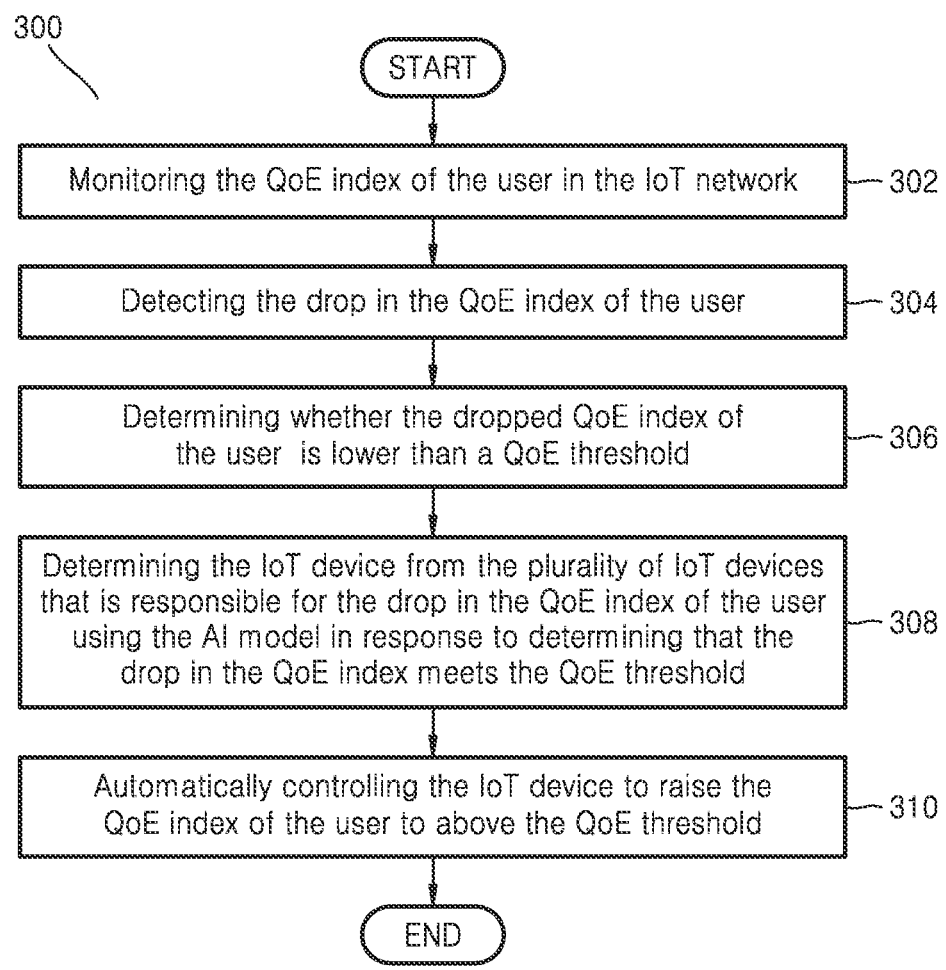
FIG. 3A is a flow diagram illustrating a method for enhancing the QoE index for the user in the IoT network, according to an embodiment of the disclosure.

FIG. 3A is a flow diagram (300) illustrating a method for enhancing the QoE index for the user in the IoT network, according to an embodiment of the disclosure. The operations (302-310) are performed by the wearable device (100).

At operation 302, the method includes monitoring the QoE index of the user in the IoT network. At operation 304, the method includes detecting the drop in the QoE index of the user. At operation 306, the method includes determining whether the dropped QoE index of the user is lower than the QoE threshold. At operation 308, the method includes determining the IoT device of the plurality of IoT devices that is responsible for the drop in the QoE index of the user using the AI model in response to determining that the dropped QoE index of the user is lower than the QoE threshold. At operation 310, the method includes automatically controlling the IoT device(s) to raise the QoE index of the user to above the QoE threshold.

Figure 3B:
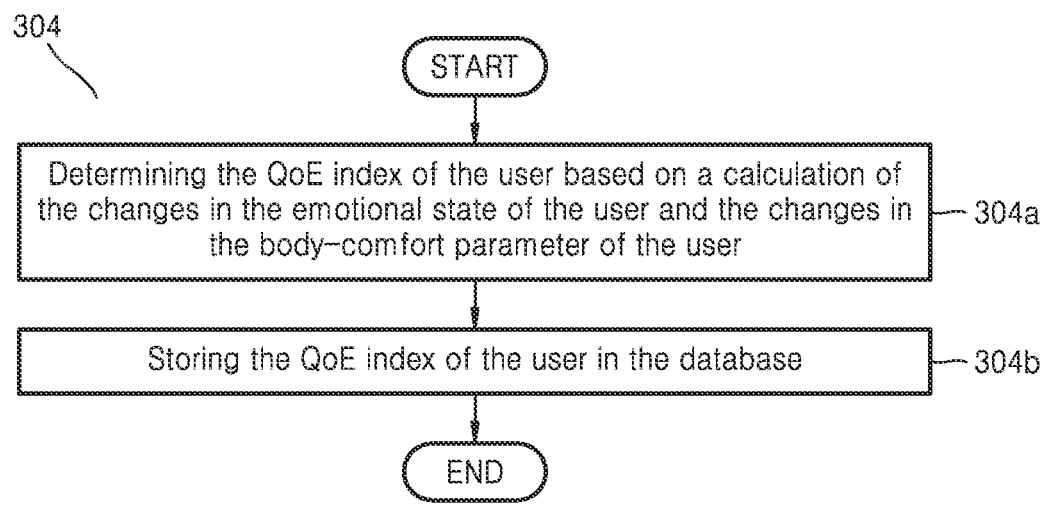
FIG. 3B is a flow diagram illustrating various operations for detecting a drop in the QoE index of the user, according to an embodiment of the disclosure.

FIG. 3B is a flow diagram (304) illustrating various operations for detecting the drop in the QoE index of the user, according to an embodiment of the disclosure. The operations (304a-304b) are performed by the wearable device (100).

At operation 304a, the method includes determining the QoE index of the user based on the calculation of the changes in the emotional state of the user and the changes in the body-comfort parameter of the user. At operation 304b, the method includes storing the QoE index of the user in the database.

Figure 3C:
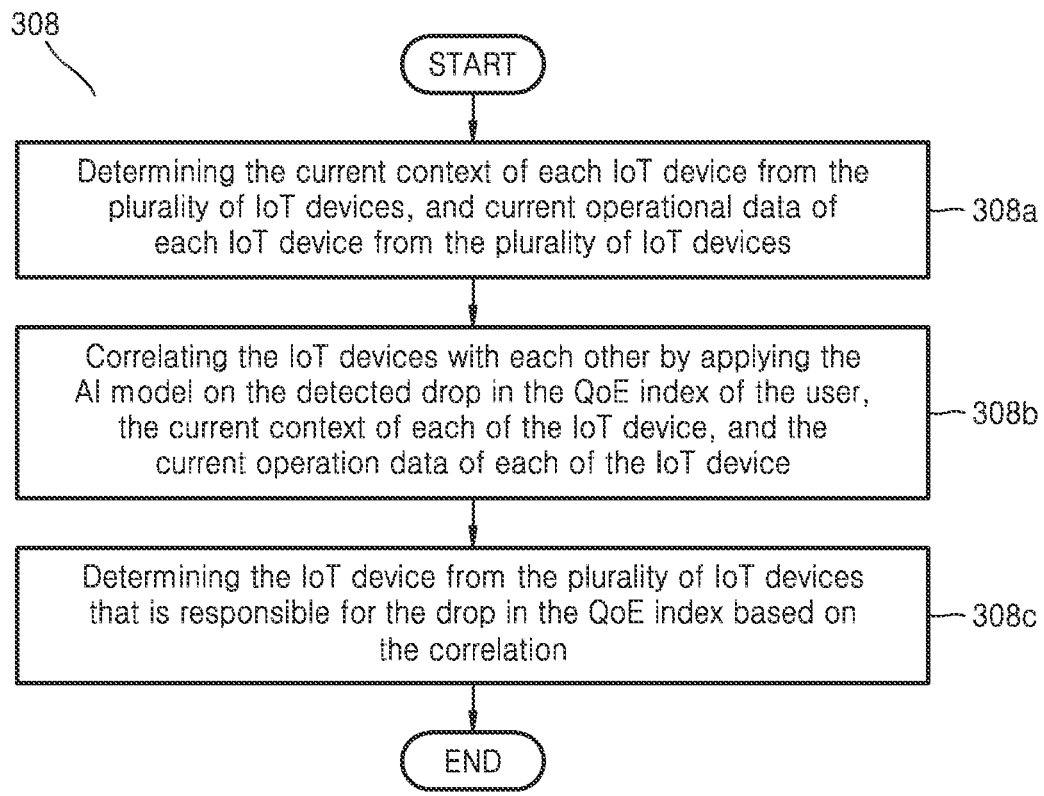
FIG. 3C is a flow diagram illustrating various operations for determining an IoT device(s) from a plurality of IoT devices that is responsible for the drop in the QoE index of the user using an AI model, according to an embodiment of the disclosure.

FIG. 3C is a flow diagram (308) illustrating various operations for determining the IoT device(s) from the plurality of IoT devices that is responsible for the drop in the QoE index of the user using an AI model, according to an embodiment of the disclosure. The operations (308a-308c) are performed by the wearable device (100).

At operation 308a, the method includes determining the current context of each IoT device of the plurality of IoT devices, and the current operational data of each IoT device of the plurality of IoT devices. At operation 308b, the method includes correlating the IoT devices with each other by applying the AI model on the detected drop in the QoE index of the user, the current context of each of the IoT devices, and the current operation data of each of the IoT device. At operation 308c, the method includes determining the IoT device of the plurality of IoT devices that is responsible for the drop in the QoE index based on the correlation.

Figure 3D:
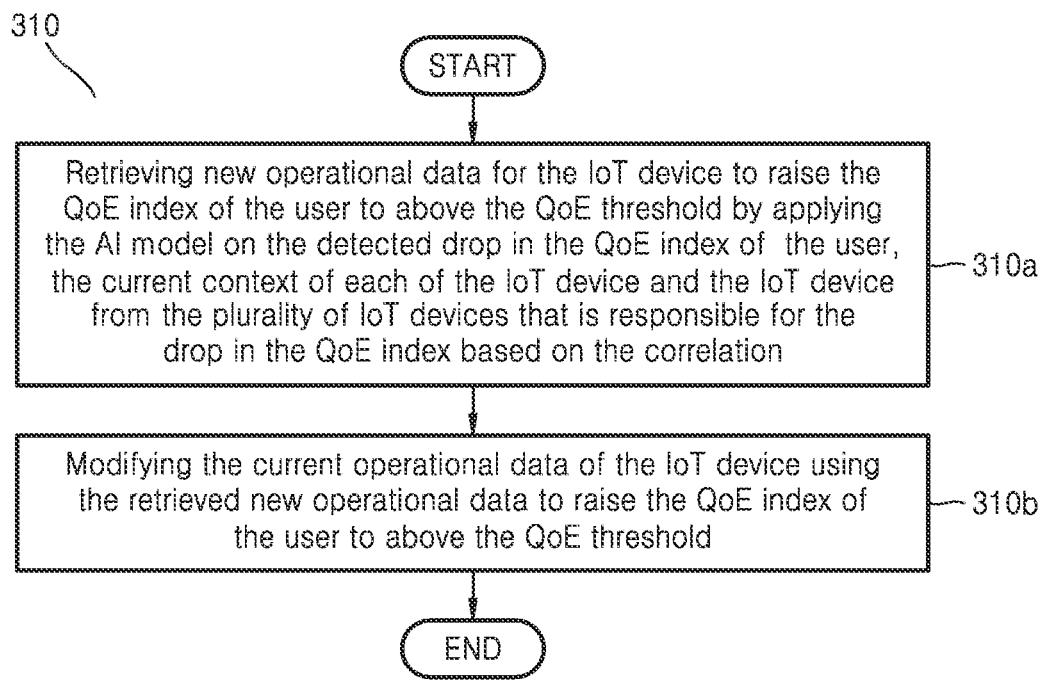
FIG. 3D is a flow diagram illustrating various operations for automatically controlling the IoT device(s) to raise the QoE index of the user above a QoE threshold, according to an embodiment of the disclosure.

FIG. 3D is a flow diagram (310) illustrating various operations for automatically controlling the IoT device(s) to raise the QoE index of the user above the QoE threshold, according to an embodiment of the disclosure. The operations (310a-310b) are performed by the wearable device (100).

At operation 310a, the method includes retrieving new operational data for the IoT device to raise the QoE index of the user to above the QoE threshold by applying the AI model on the detected drop in the QoE index of the user, the current context of each of the IoT device and the IoT device of the plurality of IoT devices that is responsible for the drop in the QoE index based on the correlation. At operation 310b, the method includes modifying the current operational data of the IoT device using the retrieved new operational data to raise the QoE index of the user to above the QoE threshold.

Figure 4:
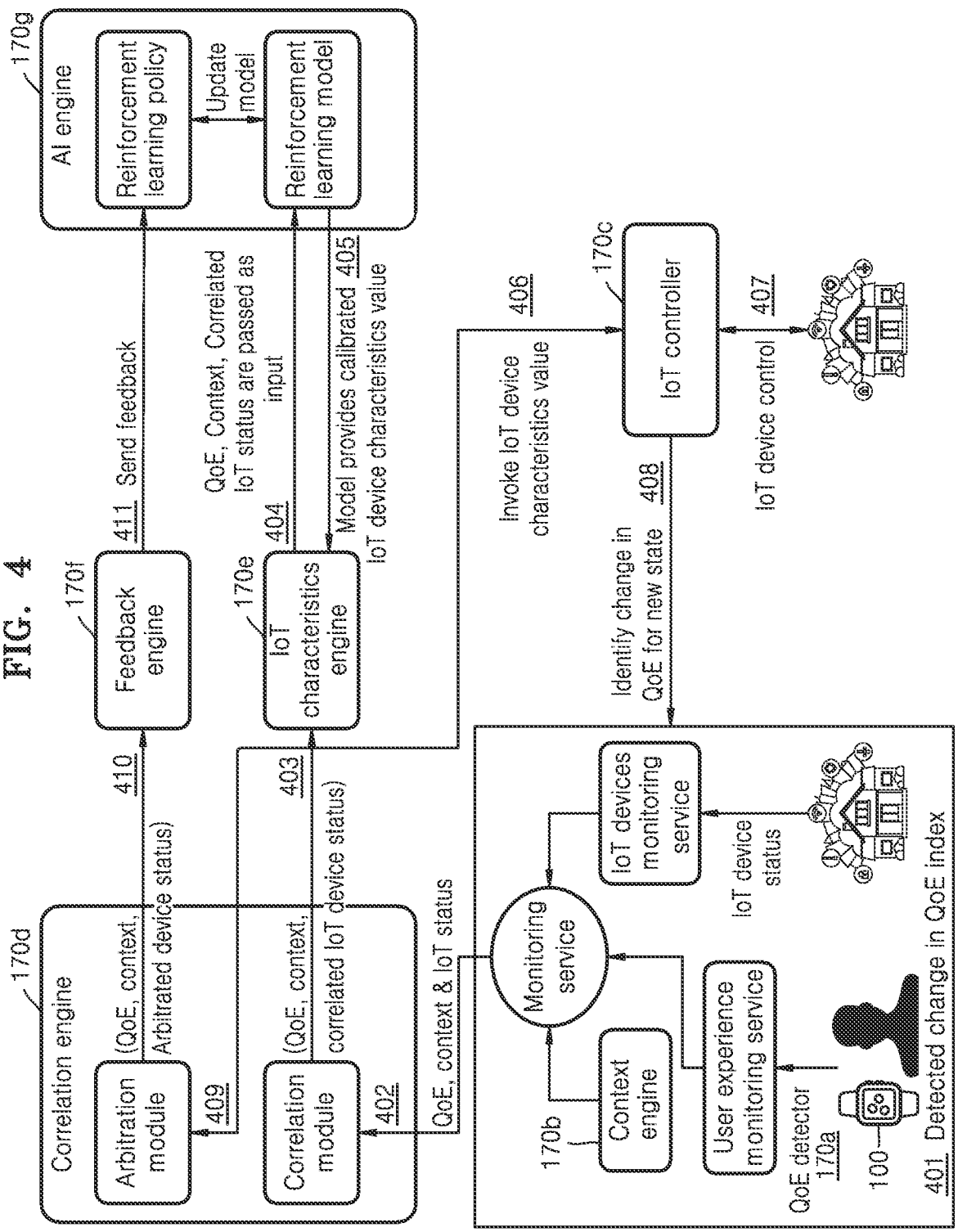
FIG. 4 illustrates a system flow of personalized learning model for enhancing the QoE index of the user through a Smartwatch in the IoT network, according to an embodiment of the disclosure.

FIG. 4 illustrates a system flow of personalized learning model for enhancing the QoE index of the user through the smartwatch (i.e. wearable device (100)) in the IoT network, according to an embodiment of the disclosure.

At operation 401, the QoE detector (170a) determines the QoE index of the user based on the calculation of changes in the emotional state of the user, changes in the body-comfort level of the user by using the sensors (150), the context engine (170b) determines the activity of the user and the environmental context associated with the user, and the IoT controller (170c) determines the current status of the IoT device of the plurality of IoT devices and the recent changes in the current status of the IoT device(s) from the plurality of IoT devices.

At operation 402, the correlation engine (170d) correlates the IoT device with each other by applying the AI model on the detected drop in the QoE index of the user, the current context of each of the IoT devices, and the current operation data of each of the IoT device. At operation 403, the IoT characteristic engine (170e) receives the QoE index of the user, the current context of each of the IoT devices, and the current operation data of each of the IoT device(s) from the correlation engine (170d). At operation 404-405, the IoT characteristic engine (170e) retrieves the new operational data (i.e. IoT device characteristics value) for the IoT device(s) to raise the QoE index of the user above the QoE threshold by applying the AI model (i.e. the AI engine (170g)) on the detected drop in the QoE index of the user, the current context of each of the IoT device and the IoT device(s) from the plurality of IoT devices that is responsible for the drop in the QoE index based on the correlation.

At operations 406-407, the IoT controller (170c) receives the new operational data from the IoT characteristic engine (170e) and modifies the current operational data of the IoT device(s) using the retrieved new operational data to raise the QoE index of the user above the QoE threshold. At operations 408-409, a monitoring service receives the modified current operational data of the IoT device(s) and raised the QoE index of the user from the IoT controller (170c), and shares with the correlation engine (170d).

At operations 410-411, the correlation engine (170d) detects the raise in the QoE index of the user in the IoT network by modifying the current operational data of the IoT device(s) using the retrieved new operational data. The correlation engine (170d) then compares the modified current operational data of the IoT device(s) with the current operational data to derive arbitration data. The correlation engine (170d) then sends the new value (arbitrated value of IoT device characteristic) corresponding to the state, to the feedback engine (170f). The feedback engine (170f) then sends the arbitrated value to the AI engine (170g). If the arbitrated value for the particular state is the same as existing in the AI engine (170g), then it's a positive reward (the AI engine (170g) has good prediction and no update needed). If the arbitrated value for the particular state is different as existing in the AI engine (170g), then it's a negative reward (model has the wrong prediction and the AI engine (170g) is updated based on the arbitrated value). Some example scenarios for the personalized learning model for enhancing the QoE index of the user are explained in FIGS. 5 and 6.

FIG. 5 is an example illustration in which the wearable device (100) detecting the drop in the QoE index of the user while the user is working in the kitchen and automatically controlling the IoT device(s) to raise the QoE index of the user over the QoE threshold according to an embodiment of the disclosure.

Consider a scenario in which the user in a kitchen (500), the QoE detector (170*a*) detects the drop in the QoE index (e.g. 60 to 30) of the user based on the calculation of changes in the emotional state (e.g. irritation) of the user, changes in the body-comfort level (e.g. sweating/humidity) of the user by using the sensors (150). Once the drop is detected, the context engine (170*b*) determines the activity of the user (e.g. cooking) and the environmental context associated with the user. Table-4 illustrates an example of the environmental context.

TABLE 4

| Environmental context | Information |
|---|---|
| Time | Afternoon |
| Location | Kitchen |
| Ambience | Bright |
| Climate | Sunny & Humid |

Furthermore, the IoT controller (170*c*) determines the current status of the IoT device of the plurality of IoT devices and the recent changes in the current status of the IoT device(s) from the plurality of IoT devices. Table-5 illustrates an example of the current status of the IoT device.

TABLE 5

| List of IoT devices in the IoT network | Current status of IoT device |
|---|---|
| AC (506) | Medium speed [since last 10 min] |
| Chimney (501) | On [running at top speed] |
| Bulb (503, 504, 505) | Off |
| Smart watch (100a, 100b) | Sweating detected |
| Humidity sensor | Moderate level |
| Temperature | Moderate [30 Degree Celsius] |
| Oven (502) | Off |
| Smart refrigerator (507) | On |

Then, the correlation engine (170*d*) correlates the IoT device with each other by applying the AI model on the detected drop in the QoE index of the user, the current context of each of the IoT devices in the kitchen (500), and the current operation data of each of the IoT device at the kitchen (500) and determine that which IoT device at the kitchen (500) can affect humidity and temperature. In other words, the correlation engine (170*d*) uses the correlation to determine which IoT device(s) in the kitchen (500) are responsible for the reduction in the QoE index. Table-6 illustrates an example of the detected QoE index, the context, and the correlated IoT device(s) status.

TABLE 6

| QoE | 60 → 30 |
|---|---|
| Context | {Time: Afternoon; Location: Kitchen; Ambience: Bright; Climate: Sunny & Humid} |
| Correlated IoT device status | {Smartwatch: Sweating detected; Chimney: On [running at top speed]; AC: Medium speed [since last 10 min]; Humidity: Moderate; Temperature: Moderate [30 Degree Celsius]; Smart refrigerator: On;} |

Then, the IoT characteristic engine (170*e*) receives Table-6 data from the correlation engine (170*d*) and retrieves the new operational data (i.e. IoT device characteristics value) for the IoT device(s) to raise the QoE index of the user above the QoE threshold by applying the AI model (i.e. the AI engine (170*g*)) on the detected drop in the QoE index of the user, the current context of each of the IoT device and the IoT device(s) from the plurality of IoT devices that is responsible for the drop in the QoE index based on the correlation. Table-7 illustrates an example of the retrieves the new operational data.

TABLE 7

| QoE | 60 → 30 (Original QoE Drop) |
|---|---|
| Smart Watch | Sweating detected |
| Chimney | On [running at top speed] |
| AC | High speed |
| Humidity | Moderate |
| Temperature | Moderate [24 Degree Celsius] |
| Context | {Time: Afternoon; Location: Kitchen; Ambience: Bright; Climate: Sunny & Humid} |

Then, the IoT controller (170*c*) modifies the current operational data of the IoT device(s) using the retrieved new operational data to raise the QoE index of the user above the QoE threshold. Furthermore, the correlation engine (170*d*) compares previous operational data or current operational data (Table-6) and new operational data (Table-8) values of the IoT device(s) and previous/current/new contexts of each IoT device of the plurality of IoT devices. Table-8 illustrates an example of the context of the new operational data.

TABLE 8

| QoE | 30 → 50 |
|---|---|
| Context | {Time: Afternoon; Location: Kitchen; Ambience: Bright; Climate: Sunny & Humid} |
| IoT device status | {Smart Watch: Negligible Sweating; Chimney: On [running at top speed]; AC: High speed; Humidity: Less Moderate; Temperature: Moderate [24 Degree Celsius]; Bulb: Off;} |

Furthermore, the correlation engine (170*d*) identifies the difference in the status of the IoT device(s), if any. Then, the correlation engine (170*d*) sends/stores the arbitration data (Table-8) in the AI engine (170*g*) for future prediction to raise the QoE index of the user above the QoE threshold.

Consider a scenario according to an embodiment in which the AI engine (170*g*) has no prediction to raise the QoE index of the user: the QoE detector (170*a*) detects the drop in the QoE index (e.g. 60 to 30) of the user based on the calculation of changes in the emotional state (e.g. irritation) of the user, changes in the body-comfort level (e.g. sweating/humidity) of the user by using the sensors (150). Once the drop is detected, the context engine (170*b*) determines the activity of the user (e.g. cooking) and the environmental context associated with the user. Table-9 illustrates an example of the environmental context.

TABLE 9

| Environmental context | Information |
| --- | --- |
| Time | Afternoon |
| Location | Kitchen |
| Ambience | Bright |
| Climate | Sunny & Humid |

Furthermore, the IoT controller (170c) determines the current status of the IoT device of the plurality of IoT devices and the recent changes in the current status of the IoT device(s) from the plurality of IoT devices. Table-10 illustrates an example of the current status of the IoT device.

TABLE 10

| List of IoT devices in the IoT network | Current status of IoT device |
| --- | --- |
| AC (506) | Medium speed [since last 10 min] |
| Chimney (501) | ON [running at top speed] |
| Bulb (503, 504, 505) | Off |
| Smart watch (100a, 100b) | Sweating detected |
| Humidity sensor | Moderate level |
| Temperature | Moderate [30 Degree Celsius] |
| Oven (502) | Off |
| Smart refrigerator (507) | On |

Then, the correlation engine (170d) correlates the IoT device with each other by applying the AI model on the detected drop in the QoE index of the user, the current context of each of the IoT devices in the kitchen (500), and the current operation data of each of the IoT device at the kitchen (500) and determine that which IoT device at the kitchen (500) can affect humidity and temperature. In other words, the correlation engine (170d) uses the correlation to determine which IoT device(s) in the kitchen (500) are responsible for the reduction in the QoE index. Table-11 illustrates an example of the detected QoE index, the context, and the correlated IoT device(s) status.

TABLE 11

| QoE | 60 → 30 |
| --- | --- |
| Context | {Time: Afternoon; Location: Kitchen; Ambience: Bright; Climate: Sunny & Humid} |
| Correlated IoT device status | {Smartwatch: Sweating detected; Chimney: On [running at top speed]; AC: Medium speed [since last 10 min]; Humidity: Moderate; Temperature: Moderate [30 Degree Celsius]; Smart refrigerator: On;} |

Then, the IoT characteristic engine (170e) receives Table-11 data from the correlation engine (170d) and retrieves no data from the AI engine (170g), as the AI engine (170g) has no prediction to raise the QoE index of the user above the QoE threshold. Then, the IoT controller (170c) identifies some change in the QoE index as the user manually invoke some action (e.g. turn on AC) to raise the QoE index. Table-12 illustrates an example of the retrieves a new operational data/context due to manually invoke some action.

TABLE 12

| QoE | 30 → 50 |
| --- | --- |
| Context | {Time: Afternoon; Location: Kitchen; Ambience: Bright; Climate: Sunny & Humid} |

TABLE 12-continued

| Arbitrated IoT device status | {Smart Watch: Negligible Sweating; Chimney: On [running at top speed]; AC: Top speed "User had manually put to Top when enter Kitchen"]; Humidity: Less moderate; Temperature: moderate [24 Degree Celsius];} |
| --- | --- |

Furthermore, the correlation engine (170d) identifies the difference in the status of the IoT device(s), if any. Then, the correlation engine (170d) sends/stores the arbitration data (Table-12) in the AI engine (170g) for future prediction to raise the QoE index of the user above the QoE threshold. Table-13 illustrates an example of the stores a new operational data for future prediction to raise the QoE index of the user above the QoE threshold.

TABLE 13

| QoE | 60 → 30 (Original QoE Drop) |
| --- | --- |
| Smart Watch | Sweating detected |
| Chimney | ON [running at top speed] |
| AC | High speed |
| Humidity | Moderate |
| Temperature | Moderate [24 Degree Celsius] |
| Context | {Time: Afternoon; Location: Kitchen; Ambience: Bright; Climate: Sunny & Humid} |

Consider a scenario according to an embodiment in which the AI engine (170g) has the wrong prediction to raise the QoE index of the user: the QoE detector (170a) detects the drop in the QoE index (e.g. 60 to 30) of the user based on the calculation of changes in the emotional state (e.g. irritation) of the user, changes in the body-comfort level (e.g. sweating/humidity) of the user by using the sensors (150). Once the drop is detected, the context engine (170b) determines the activity of the user (e.g. cooking) and the environmental context associated with the user. Table-14 illustrates an example of the environmental context.

TABLE 14

| Environmental context | Information |
| --- | --- |
| Time | Afternoon |
| Location | Kitchen |
| Ambience | Bright |
| Climate | Sunny & Humid |

Furthermore, the IoT controller (170c) determines the current status of the IoT device of the plurality of IoT devices and the recent changes in the current status of the IoT device(s) from the plurality of IoT devices. Table-15 illustrates an example of the current status of the IoT device.

TABLE 15

| List of IoT devices in the IoT network | Current status of IoT device |
| --- | --- |
| AC (506) | Low speed [since last 10 min] |
| Chimney (501) | On [running at top speed] |
| Bulb (503, 504, 505) | Off |
| Smart watch (100a, 100b) | Sweating detected |
| Humidity sensor | Moderate level |
| Temperature | Moderate [30 Degree Celsius] |
| Oven (502) | Off |
| Smart refrigerator (507) | On |

Then, the correlation engine (170d) correlates the IoT device with each other by applying the AI model on the detected drop in the QoE index of the user, the current context of each of the IoT devices in the kitchen (500), and the current operation data of each of the IoT device at the kitchen (500) and determine that which IoT device at the kitchen (500) can affect humidity and temperature. In other words, the correlation engine (170*d*) uses the correlation to determine which IoT device(s) in the kitchen (500) are responsible for the reduction in the QoE index. Table-16 illustrates an example of the detected QoE index, the context, and the correlated IoT device(s) status.

TABLE 16

| | |
|---|---|
| QoE | 60 → 30 |
| Context | {Time: Afternoon; Location: Kitchen; Ambience: Bright; Climate: Sunny & Humid} |
| Correlated IoT device status | {Smartwatch: Sweating detected; Chimney: On [running at top speed]; AC: Low speed [since last 10 min]; Humidity: Moderate; Temperature: Moderate [30 Degree Celsius]; Smart refrigerator: On;} |

Then, the IoT characteristic engine (170*e*) receives Table-16 data from the correlation engine (170*d*) and retrieves the new operational data (i.e. IoT device characteristics value) for the IoT device(s) to raise the QoE index of the user above the QoE threshold by applying the AI model (i.e. the AI engine (170*g*)) on the detected drop in the QoE index of the user, the current context of each of the IoT device and the IoT device(s) from the plurality of IoT devices that is responsible for the drop in the QoE index based on the correlation. Then, the IoT controller (170*c*) identifies some change in the QoE index as the user manually invokes some action (e.g. turn on AC at top speed) to raise the QoE index. Table-17 illustrates an example of the retrieves a new operational data/context due to manually invoke some action.

TABLE 17

| | |
|---|---|
| QoE | 30 → 50 |
| Context | {Time: Afternoon; Location: Kitchen; Ambience: Bright; Climate: Sunny & Humid} |
| Arbitrated IoT device status | {Smart Watch: Negligible Sweating; Chimney: On [running at top speed]; AC: Top speed "User had manually put to Top when enter Kitchen"]; Humidity: Less Moderate; Temperature: Moderate [24 Degree Celsius];} |

Furthermore, the correlation engine (170*d*) identifies the difference in the status of the IoT device(s), if any. Then, the correlation engine (170*d*) sends/stores the arbitration data (Table-16) in the AI engine (170*g*) for future prediction to raise the QoE index of the user above the QoE threshold. Table-18 illustrates an example of the stores a new operational data for future prediction to raise the QoE index of the user above the QoE threshold.

TABLE 18

| | |
|---|---|
| QoE | 60 → 30 (Original QoE Drop) |
| Smart Watch | Sweating detected |
| Chimney | On [running at top speed] |
| AC | High speed |
| Humidity | Moderate |
| Temperature | Moderate [24 Degree Celsius] |
| Context | {Time: Afternoon; Location: Kitchen; Ambience: Bright; Climate: Sunny & Humid} |

In this scenario, the IoT characteristics engine (170*e*) predicted the wrong value using the AI engine (170*g*). So, the IoT characteristics engine (170*e*) updates the correct value to the AI engine (170*g*) for future prediction to raise the QoE index of the user above the QoE threshold.

Figure 6:
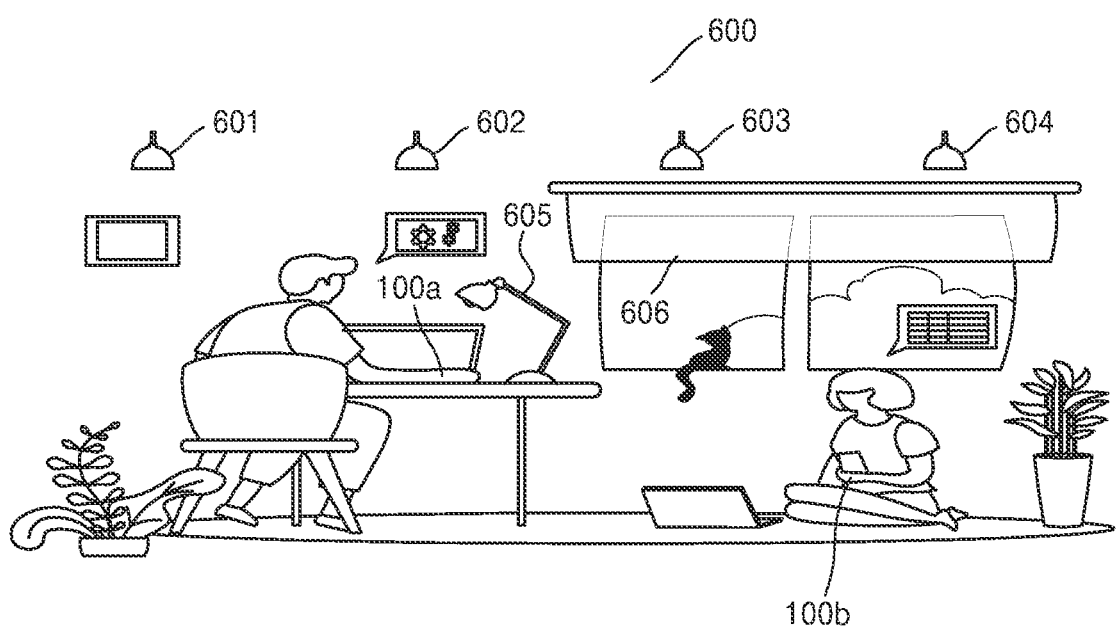
FIG. 6 is an example illustration in which the wearable device detecting the drop in the QoE index of the user while the user is working on a laptop in a study room and automatically controlling the IoT device(s) to raise the QoE index of the user over the QoE threshold according to an embodiment of the disclosure.

FIG. 6 is an example illustration in which the wearable device (100) detecting the drop in the QoE index of the user while the user(s) is working on a laptop in a study room (600) and automatically controlling the IoT device(s) to raise the QoE index of the user over the QoE threshold according to an embodiment of the disclosure.

Consider a scenario in which the user in the study room (600), the QoE detector (170*a*) detects the drop in the QoE index (e.g. 60 to 45) of the user based on the calculation of changes in the emotional state (e.g. irritation) of the user, changes in the body-comfort level (e.g. sweating/humidity) of the user by using the sensors (150). Once the drop is detected, the context engine (170*b*) determines the activity of the user (e.g. working) and the environmental context associated with the user. Table-19 illustrates an example of the environmental context.

TABLE 19

| Environmental context | Information |
|---|---|
| Time | Midday |
| Location | Study Room @ Home |
| Ambience | Bright |
| Climate | Rainy Season |

Furthermore, the IoT controller (170*c*) determines the current status of the IoT device of the plurality of IoT devices and the recent changes in the current status of the IoT device(s) from the plurality of IoT devices. Table-20 illustrates an example of the current status of the IoT device.

TABLE 20

| List of IoT devices in the IoT network | Current status of IoT device |
|---|---|
| Fan | On [since last 4 hours] |
| Bulb (601-606) | On [since last 4 hours] |
| Window blinds (606) | Open [since last 7 hours] |
| Smart Watch (100a, 100b) | Stress detected |
| Ambient light | 800 lux (high) |
| Temperature | Moderate [24 Degree Celsius] |
| Vent/Exhaust Air | On [since last 7 hour] |

Then, the correlation engine (170*d*) correlates the IoT device with each other by applying the AI model on the detected drop in the QoE index of the user, the current context of each of the IoT devices in the study room (600), and the current operation data of each of the IoT device at study room (600) and determine that which IoT device at the study room (600) can affect humidity and temperature. In other words, the correlation engine (170*d*) uses the correlation to determine which IoT device(s) in the study room (600) are responsible for the reduction in the QoE index. Table-21 illustrates an example of the detected QoE index, the context, and the correlated IoT device(s) status.

TABLE 21

| | |
|---|---|
| QoE | 60 → 45 |
| Context | {Time: Midday; Location: Study Room @ Home; Ambience: Bright; Climate: Rainy Season} |
| Correlated IoT Device Status | {Smart Watch: Stress Detected; Fan: ON [since last 4 hour]; Bulb: On [since last 4 hour]; Window blinds: Open [since last 7 hour]; Ambient light: 800 lux (high)} |

Then, the IoT characteristic engine (170e) receives Table-21 data from the correlation engine (170d) and retrieves the new operational data (i.e. IoT device characteristics value) for the IoT device(s) to raise the QoE index of the user above the QoE threshold by applying the AI model (i.e. the AI engine (170g)) on the detected drop in the QoE index of the user, the current context of each of the IoT device and the IoT device(s) from the plurality of IoT devices that is responsible for the drop in the QoE index based on the correlation. Table-22 illustrates an example of the retrieves the new operational data.

TABLE 22

| List of IoT devices in the IoT network | New operational data for IoT device |
|---|---|
| Fan | On |
| Bulb (601-606) | Off |
| Window blinds (606) | Partially open |
| Vent/Exhaust | On |

Then, the IoT controller (170c) modifies the current operational data of the IoT device(s) using the retrieved new operational data to raise the QoE index of the user above the QoE threshold. Furthermore, the correlation engine (170d) compares previous operational data or current operational data (Table-20) and new operational data (Table-22) values of the IoT device(s) and previous/current/new contexts of each IoT device of the plurality of IoT devices. Table-23 illustrates an example of the context of the new operational data.

TABLE 23

| QoE | 45 → 55 |
|---|---|
| Context | {Time: Midday; Location: Study Room @ Home; Ambience: Bright; Climate: Rainy Season} |
| IoT device status | {Smart Watch: No Stress Detected; Fan: On [since last 4 hour]; Bulb: OFF [since last 4 hour]; Window blinds: Partially Close [since last 7 hour]; Ambient light: 450 lux (normal); Temperature: 24 C.; Vent: On}} |

Furthermore, the correlation engine (170d) identifies the difference in the status of the IoT device(s), if any. Then, the correlation engine (170d) sends/stores the arbitration data (Table-23) in the AI engine (170g) for future prediction to raise the QoE index of the user above the QoE threshold. Table-24 illustrates an example of the stores a new operational data for future prediction to raise the QoE index of the user above the QoE threshold.

TABLE 24

| QoE | 60 → 45 (Original QoE Drop) |
|---|---|
| Smart Watch | Stress detected |
| Fan | On |
| Bulb (601-606) | Off |
| Window blinds (606) | Partially open |
| Ambient light | 450 lux (normal) |
| Temperature | Moderate |
| Vent/Exhaust Air | On |
| Context | {Time: Midday; Location: Study Room @ Home; Ambience: Bright; Climate: Rainy Season} |

The embodiments disclosed herein can be implemented using at least one hardware device and performing network management functions to control the elements.

While the disclosure has been shown and described with reference to various embodiments therein, it will be understood by those skilled in the art that various changes in form and details may be made therein without departing from the spirit and scope of the disclosure as defined by the appended claims and their equivalents.

In accordance with an aspect of the disclosure, a method for enhancing a QoE index for a user in an IoT network comprising a plurality of IoT devices is provided. The method includes monitoring, by a wearable device, the QoE index of the user in the IoT network, detecting, by the wearable device of the user, a drop in the QoE index of the user, determining, by the wearable device, whether the dropped QoE index of the user is lower than a QoE threshold, in response to determining that the dropped QoE index of the user is lower than the QoE threshold, determining, by the wearable device, at least on IoT device from the plurality of IoT devices that is responsible for the drop in the QoE index of the user using an AI model, and automatically controlling, by the wearable device, the at least one IoT device to raise the QoE index of the user above the QoE threshold.

Accordingly, an aspect of the disclosure is to detect a change/drop in a QoE index of a user (i.e. QoE drops below a pre-defined QoE threshold). The QoE index of the user is automatically detected based on a change in emotional state (e.g. a calm state to an agitated state, sudden irritation state) of the user and change in body comfort parameter (e.g. sweating, breath shortness, etc.) of the user using a wearable device and automatically control IoT device(s) to raise the QoE index of the user above the QoE threshold. The IoT device(s) are automatically controlled to raise the user's QoE index without manual intervention, resulting in convenient, continuous, and accurate monitoring of the QoE index discreetly at backend.

In an embodiment, where detecting, by the wearable device of the user, the drop in the QoE index of the user includes determining, by the wearable device of the user, the QoE index of the user based on a calculation of changes in an emotional state of the user and changes in a body-comfort parameter of the user. Further, the method includes storing, by the wearable device of the user, the QoE index of the user in database.

In an embodiment, where the emotional state of the user comprises a calm state to an agitate state and a sudden irritation state, and where the body-comfort parameter of the user comprises, but not limited to sweating, breath shortness.

In an embodiment, where determining, by the wearable device of the user, the IoT device(s) from the plurality of IoT devices that is responsible for the drop in the QoE index of the user using the AI model includes determining, by the wearable device of the user, a current context of each IoT device of the plurality of IoT devices, and current operational data of each IoT device of the plurality of IoT devices. Further, the method includes correlating, by the wearable device of the user, the current context and the current operational data of each IoT device with the detected drop in the QoE index of the user using the AI model. Further, the method includes determining, by the wearable device of the user, the IoT device(s) from the plurality of IoT devices that is responsible for the drop in the QoE index based on the correlation.

An embodiment of the disclosure is to determine current context of each IoT device of a plurality of IoT devices and current operational data (e.g. operational setting) of each IoT device of the plurality of IoT devices. Furthermore, the wearable device correlates the IoT device with each other by applying an Artificial intelligence (AI) model on the detected drop in the QoE index of the user, the current context of each of the IoT device, and the current operation data of each of the IoT device. Furthermore, the wearable device determines the IoT device(s) from the plurality of IoT devices that is responsible for the drop in the QoE index based on the correlation.

In an embodiment, where determining, by the wearable device of the user, the current context of each IoT device of the plurality of IoT devices includes determining, by the wearable device of the user, an activity of the user. Further, the method includes determining, by the wearable device of the user, environmental context associated with the user.

In an embodiment, where determining, by the wearable device of the user, the current operational data of each IoT device of the plurality of IoT devices includes determining, by the wearable device of the user, the current status of the IoT device(s) from the plurality of IoT devices. Further, the method includes determining, by the wearable device of the user, recent changes in the current status of the IoT device(s) from the plurality of IoT devices.

In an embodiment, where controlling, by the wearable device of the user, the IoT device(s) to raise the QoE index of the user above the QoE threshold includes retrieving, by the wearable device of the user, new operational data for the IoT device(s) to raise the QoE index of the user above the QoE threshold by applying the AI model on the detected drop in the QoE index of the user, the current context of each of the IoT device and the IoT device(s) from the plurality of IoT devices that is responsible for the drop in the QoE index based on the correlation. Further, the method includes modifying, by the wearable device of the user, a current operational state of the IoT device(s) using the retrieved new operational data to raise the QoE index of the user above the QoE threshold.

In an embodiment, where the AI model trained by detecting, by the wearable device of the user, a raise in the QoE index of the user in the IoT network by modifying the current operational data of the IoT device(s) using the retrieved new operational data. Further, the method includes comparing, by the wearable device of the user, the modified current operational data of the IoT device(s) with the current operational data to derive arbitration data. Further, the method includes storing, by the wearable device of the user, the derived arbitration data in the AI model for future prediction to raise the QoE index of the user above the QoE threshold.

In an embodiment, when the AI model has none or inaccurate prediction for the drop in the QoE index, the AI model learns from the user's manually invoked action in the IoT network to raise the QoE index of the user above the QoE threshold.

In an embodiment, where the AI model can be further applied partially or fully to different IoT devices or environments. Further, the method includes comparing the QoE index of current individual IoT devices with that of similar anonymized individuals with respect to a user preference of settings/state of one or more common IoT devices in a similar context or situation. Further, the method includes storing of settings/status of the QoE index and context information of multiple individuals in an anonymized fashion in order to detect the initial position of operation/status of one or more common intersecting IoT devices and use of this information to expedite the learning of one or more AI models in order to enhance or maintain the QoE index of the current individual as measured by their wearable or equivalent device.

In accordance with an embodiment of the disclosure, a wearable device for enhancing the QoE index for the user in the IoT network is provided. The wearable device includes a QoE controller coupled with at least one processor and a memory. The QoE controller is configured to monitor the QoE index of the user in the IoT network, detect the drop in the QoE index of the user, determine whether the dropped QoE index of the user is lower than the QoE threshold, in response to the determination that the dropped QoE index of the user is lower than the QoE threshold, determine at least one IoT device from the plurality of IoT devices that is responsible for the drop in the QoE index of the user using the AI model, and control the IoT device(s) to raise the QoE index of the user above the QoE threshold.

Accordingly, an aspect of the disclosure is resulting in convenient, continuous, and accurate monitoring of the QoE index discreetly at backend.

In an embodiment, the at least one processor is further configured to determine the QoE index of the user based on a calculation of at least one of changes in an emotional state of the user or changes in a body-comfort parameter of the user; and store the QoE index of the user in database.

In an embodiment, the at least one processor is further configured to determine a current context of each IoT device of the plurality of IoT devices, and current operational data of each IoT device of the plurality of IoT devices. The at least one processor if further configured to correlate the current context and the current operational data of each IoT device with the detected drop in the QoE index of the user using the at least one AI model. The at least one processor if further configured to determine the at least one IoT device of the plurality of IoT devices that is responsible for the drop in the QoE index based on the correlation.

In an embodiment, the at least one processor is further configured to determine current status of the at least one IoT device of the plurality of IoT devices. The at least one processor is further configured to determine recent changes in the current status of the at least one IoT device of the plurality of IoT devices.

In accordance with an embodiment of the disclosure, a computer-readable recording medium is provided. The computer-readable recording medium has recorded thereon a program for executing, a method for enhancing a QoE index for a user in an IoT network comprising a plurality of IoT devices. The method includes monitoring, by a wearable device, the QoE index of the user in the IoT network, detecting, by the wearable device of the user, a drop in the QoE index of the user, determining, by the wearable device, whether the dropped QoE index of the user is lower than a QoE threshold, in response to determining that the dropped QoE index of the user is lower than the QoE threshold, determining, by the wearable device, at least on IoT device from the plurality of IoT devices that is responsible for the drop in the QoE index of the user using an AI model, and controlling, by the wearable device, the at least one IoT device to raise the QoE index of the user above the QoE threshold.

The invention claimed is:

1. A method for enhancing a Quality of Experience (QoE) index for a user in an Internet of things (IoT) network comprising a plurality of IoT devices, the method comprising:

monitoring, by a wearable device, the QoE index of the user in the IoT network;

detecting, by the wearable device, a drop in the QoE index of the user;

determining, by the wearable device, whether the dropped QoE index of the user is lower than a QoE threshold;

in response to determining that the dropped QoE index of the user is lower than the QoE threshold, determining, by the wearable device, at least one IoT device of the plurality of IoT devices that is responsible for the drop in the QoE index of the user using at least one Artificial intelligence (AI) model; and controlling, by the wearable device, the at least one IoT device to raise the QoE index of the user above the QoE threshold.

2. The method of claim 1, wherein the detecting of the drop in the QoE index of the user comprises:

determining, by the wearable device, the QoE index of the user based on a calculation of at least one of changes in an emotional state of the user or changes in a body-comfort parameter of the user; and storing, by the wearable device, the QoE index of the user in database.

3. The method of claim 2, wherein changes in the emotional state of the user comprises at least change from a calm state to an agitated state, or a sudden irritation state, and wherein the body-comfort parameter of the user comprises at least sweating, or shortness of breath.

4. The method of claim 1, wherein the determining the at least one IoT device of the plurality of IoT devices that is responsible for the drop in the QoE index of the user using the at least one AI model comprises:

determining, by the wearable device, a current context of each IoT device of the plurality of IoT devices, and current operational data of each IoT device of the plurality of IoT devices;

correlating, by the wearable device, the current context and the current operational data of each IoT device with the detected drop in the QoE index of the user using the at least one AI model; and determining, by the wearable device, the at least one IoT device of the plurality of IoT devices that is responsible for the drop in the QoE index based on the correlation.

5. The method of claim 4, wherein the determining of the current context of each IoT device of the plurality of IoT devices comprises:

determining, by the wearable device, at least one activity of the user; and determining, by the wearable device, environmental context associated with the user.

6. The method of claim 4, wherein the determining of the current operational data of each IoT device of the plurality of IoT devices comprises:

determining, by the wearable device, current status of the at least one IoT device of the plurality of IoT devices; and determining, by the wearable device, recent changes in the current status of the at least one IoT device of the plurality of IoT devices.

7. The method of claim 1, wherein the controlling of the at least one IoT device to raise the QoE index of the user above the QoE threshold comprises:

retrieving, by the wearable device, new operational data for the at least one IoT device to raise the QoE index of the user above the QoE threshold by applying the at least one AI model on the detected drop in the QoE index of the user, and a current context of each IoT device of the at least one IoT device that is responsible for the drop in the QoE index based on a correlation; and modifying, by the wearable device, a current operational data of the at least one IoT device using the retrieved new operational data to raise the QoE index of the user above the QoE threshold.

8. The method of claim 1, wherein the at least one AI model is trained by:

detecting, by the wearable device, a raise in the QoE index of the user in the IoT network by modifying a current operational data of the at least one IoT device using a retrieved new operational data;

comparing, by the wearable device, the modified current operational data of the at least one IoT device with the current operational data to derive arbitration data; and storing, by the wearable device, the derived arbitration data in the at least one AI model for future prediction to raise the QoE index of the user above the QoE threshold.

9. The method of claim 1, further comprising:

when the at least one AI model has none or inaccurate prediction for the drop in the QoE index, learning, by the at least one AI model, from a user's manually invoked action in the IoT network to raise the QoE index of the user above the QoE threshold.

10. The method of claim 1, further comprising:

applying the at least one AI model either partially or fully to different IoT devices or environment.

11. A wearable device enhancing a Quality of Experience (QoE) index for a user in an Internet of things (IoT) network comprising a plurality of IoT devices, the wearable device comprising:

a memory;

at least one processor; and a QoE controller, operably connected to the memory and the at least one processor, and configured to:

monitor the QoE index of the user in the IoT network, detect a drop in the QoE index of the user, determine whether the dropped QoE index of the user is lower than a QoE threshold, in response to the determination that the dropped QoE index of the user is lower than the QoE threshold, determine at least one IoT device of the plurality of IoT devices that is responsible for the drop in the QoE index of the user, using at least one Artificial intelligence (AI) model, and control the at least one IoT device to raise the QoE index of the user above the QoE threshold.

12. The wearable device of claim 11, wherein the at least one processor is further configured to:

determine the QoE index of the user based on a calculation of at least one of changes in an emotional state of the user or changes in a body-comfort parameter of the user; and store the QoE index of the user in database.

13. The wearable device of claim 12, wherein the emotional state of the user comprises at least a calm state to an agitate state or a sudden irritation state, and wherein the body-comfort parameter of the user comprises at least sweating, or shortness of breath.

14. The wearable device of claim 11, wherein the at least one processor is further configured to:

determine a current context of each IoT device of the plurality of IoT devices, and current operational data of each IoT device of the plurality of IoT devices;

correlate the current context and the current operational data of each IoT device with the detected drop in the QoE index of the user using the at least one AI model; and determine the at least one IoT device of the plurality of IoT devices that is responsible for the drop in the QoE index based on the correlation.

15. The wearable device of claim 14, wherein the at least one processor is further configured to:

determine current status of the at least one IoT device of the plurality of IoT devices; and determine recent changes in the current status of the at least one IoT device of the plurality of IoT devices.

16. The wearable device of claim 14, wherein the processor is further configured to:

determine at least one activity of the user; and determine environmental context associated with the user.

17. The wearable device of claim 11, wherein the processor is further configured to:

retrieve new operational data for the at least one IoT device to raise the QoE index of the user above the QoE threshold by applying the at least one AI model on the detected drop in the QoE index of the user, and a current context of each IoT device of the at least one IoT device that is responsible for the drop in the QoE index based on a correlation; and modify a current operational state of the at least one IoT device using the retrieved new operational data to raise the QoE index of the user above the QoE threshold.

18. The wearable device of claim 11, wherein, to train the at least one AI model, the processor is further configured to:

detect a raise in the QoE index of the user in the IoT network by modifying a current operational data of the at least one IoT device using a retrieved new operational data;

compare the modified current operational data of the at least one IoT device with the current operational data to derive arbitration data; and store the derived arbitration data in the at least one AI model for future prediction to raise the QoE index of the user above the QoE threshold.

19. The wearable device of claim 11, wherein the processor is further configured to:

when the at least one AI model has none or inaccurate prediction for the drop in the QoE index, learn, by the at least one AI model, from a user's manually invoked action in the IoT network to raise the QoE index of the user above the QoE threshold.

20. A non-transitory computer-readable recording medium having recorded thereon a program including instructions that, when executed by a processor, cause the processor to control for:

monitoring, by a wearable device, a Quality of Experience (QoE) index of a user in an Internet of things (IoT) network;

detecting, by the wearable device, a drop in the QoE index of the user;

determining, by the wearable device, whether the dropped QoE index of the user is lower than a QoE threshold;

in response to determining that the dropped QoE index of the user is lower than the QoE threshold, determining, by the wearable device, at least one IoT device of a plurality of IoT devices that is responsible for the drop in the QoE index of the user using at least one Artificial intelligence (AI) model; and controlling, by the wearable device, the at least one IoT device to raise the QoE index of the user above the QoE threshold.

* * * * *